(12) United States Patent
Caron et al.

(10) Patent No.: US 10,814,730 B2
(45) Date of Patent: Oct. 27, 2020

(54) CRYOSTAT AND ASSOCIATED MAGLEV TRANSPORT VEHICLE AND SYSTEM

(71) Applicant: METROLAB, Paris (FR)

(72) Inventors: Jean-Paul Caron, Saint Thibault les Vignes (FR); Pierre Bernstein, Crouay (FR); Jacques Noudem, Herouville St-Clair (FR); Muhamad Aburas, Caen (FR); Elisabeth Delivet, Caumont L'Evente (FR); Benoit Bougle, Luc-sur-Mer (FR)

(73) Assignee: METROLAB, Paris (FR)

( * ) Notice: Subject to any disclaimer, the term of this patent is extended or adjusted under 35 U.S.C. 154(b) by 427 days.

(21) Appl. No.: 15/562,956

(22) PCT Filed: Jun. 8, 2015

(86) PCT No.: PCT/EP2015/062723
§ 371 (c)(1),
(2) Date: Sep. 29, 2017

(87) PCT Pub. No.: WO2015/121507
PCT Pub. Date: Aug. 20, 2015

(65) Prior Publication Data
US 2018/0111505 A1    Apr. 26, 2018

(30) Foreign Application Priority Data
Mar. 31, 2015    (FR) .................................... 15 52755

(51) Int. Cl.
*B60L 13/04*    (2006.01)
*F17C 3/08*    (2006.01)
(Continued)

(52) U.S. Cl.
CPC ............ *B60L 13/04* (2013.01); *F16C 37/005* (2013.01); *F17C 3/085* (2013.01); *F16C 32/0438* (2013.01)

(58) Field of Classification Search
CPC .......... B60L 13/08; B60L 13/04; F17C 3/085; F16C 37/005
See application file for complete search history.

(56) References Cited

U.S. PATENT DOCUMENTS 5,317,976 A    6/1994  Aruga et al.
5,868,077 A    2/1999  Kuznetsov
(Continued)

FOREIGN PATENT DOCUMENTS

CN    101192463 A    6/2008
CN    101314544 A    12/2008
(Continued)

OTHER PUBLICATIONS

International Search Report for PCT/EP2015/062723 dated Nov. 11, 2015.

*Primary Examiner* — Scott A Browne
(74) *Attorney, Agent, or Firm* — Pearne & Gordon LLP

(57) ABSTRACT

A cryostat intended to be integrated into a maglev transport system, the cryostat comprising at least one superconductive element and a jacket inside which each superconductive element is placed. The cryostat is suitable for maintaining each superconductive element at the desired temperature and the jacket extending along a longitudinal axis (X). The length of each superconductive element along the longitudinal axis (X) is comprised between 30% and 100% of the length of the jacket, and each superconductive element is a bulk element made of superconductor material.

12 Claims, 2 Drawing Sheets

(51) Int. Cl.
*F16C 37/00* (2006.01)
*F16C 32/04* (2006.01)

(56) References Cited

U.S. PATENT DOCUMENTS

| | | |
|---|---|---|
| 9,634,540 B2 | 4/2017 | Kou et al. |
| 2014/0327327 A1 | 11/2014 | Kou et al. |
| 2016/0380516 A1* | 12/2016 | Tomsic ............... H01F 6/06 505/163 |

FOREIGN PATENT DOCUMENTS

| | | | | |
|---|---|---|---|---|
| CN | 102114790 A | 7/2011 | | |
| CN | 102594220 A | 7/2012 | | |
| CN | 102717724 A | 10/2012 | | |
| CN | 103950391 A | 7/2014 | | |
| EP | 1390992 B1 | 8/2006 | | |
| JP | H05161218 A | 6/1993 | | |
| JP | H05336616 A | 12/1993 | | |
| JP | 06284507 A | * 10/1994 | ............. B60L 13/08 |
| JP | H06284507 A | 10/1994 | | |
| JP | 2002222619 A | 8/2002 | | |

* cited by examiner

CRYOSTAT AND ASSOCIATED MAGLEV TRANSPORT VEHICLE AND SYSTEM

This application is a National Stage application of PCT international application PCT/EP2015/062723, filed on Jun. 8, 2015 which claims the priority of French Patent Application No. 15 52755, filed with the French Patent Office on Mar. 31, 2015, both of which are incorporated herein by reference in their entirety.

The present invention relates to a cryostat intended to be integrated into a maglev transport system, the cryostat comprising at least one superconductive element and a jacket inside which each superconductive element is placed, the cryostat being suitable for maintaining each superconductive element at the desired temperature and the jacket extending along a longitudinal axis.

The present invention also relates to a maglev transport vehicle comprising such a cryostat and a maglev transport system comprising such a vehicle.

In the field of maglev transport systems, it is known to use a maglev vehicle comprising maglev means, able to interact with a magnetic track, in order to keep the vehicle levitating above the track. The maglev means generally comprise cryostats, at least one superconductive element and a coolant intended to cool each superconductive element and keep it at a desired temperature being arranged in said cryostats. It is the interaction between each superconductive element and the magnetic track that induces a magnetic levitation force, exerted between the track and each superconductive element and causing the vehicle to levitate above the magnetic track.

Such a superconductive element is for example described in document EP 1,390,992 B1, which describes superconductive elements with a base of magnesium diboride, able to be used in levitation systems. However, the levitation force induced when such a superconductive element is positioned above a magnetic track, i.e., immersed in a magnetic induction field, is limited and insufficient to keep a vehicle, such as a rail vehicle, levitated.

It is thus known to manufacture cryostats comprising a plurality of superconductive elements, so that the cryostats are able to induce a levitation force sufficient to allow the rail vehicle to levitate. However, such cryostats are costly and, when arranged above the magnetic track, induce a limited levitation force relative to their size. Indeed, in such cryostats, in order to increase the levitation force able to be induced by the cryostat when it interacts with a magnetic induction field, it is necessary to increase the size of the cryostat so as to increase the number of superconductive elements comprised in the cryostat.

The aim of the invention is therefore to propose a cryostat incorporating superconductive elements with a lower manufacturing cost and that is able to induce, when it interacts with a magnetic induction field, an optimized levitation force, in particular relative to its size.

To that end, the invention relates to a cryostat of the aforementioned type, characterized in that the length of each superconductive element along the longitudinal axis is comprised between 30% and 100% of the length of the jacket, and each superconductive element is a bulk element made of superconductor material.

Owing to the invention, the manufacturing cost and the levitation force that can be induced by the cryostat, in particular when it is positioned above a magnetic track, are improved. Indeed, the fact that each superconductive element has a substantial length, compared to the size of the cryostat, makes it possible to minimize the number of superconductive elements arranged in the jacket of the cryostat, while optimizing the levitation force able to be induced by the cryostat.

According to advantageous but optional aspects of the invention, such a cryostat further comprises one or more of the following features, considered alone or in any technically allowable combination:

- each superconductive element is made from magnesium diboride;
- each superconductive element has, in a horizontal cutting plane perpendicular to a vertical axis of the cryostat, a horizontal section in the form of an open-worked surface;
- the horizontal section has a area comprised between 2% and 75%, preferably between 5% and 30%, of the area of the total surface defined by an outer contour of the horizontal section;
- the horizontal section has an outer contour and an inner contour with a globally rectangular or elliptical shape;
- the superconductive element(s) occupy, along a transverse axis of the cryostat, perpendicular to the longitudinal axis, between 60% and 100% of the width of the jacket 34;
- the length of the jacket is comprised between 30 cm and 3 m, preferably between 40 cm and 150 cm.

The invention also relates to a maglev transport vehicle, comprising at least one cryostat as defined above, the cryostat being intended to be positioned faced to a magnetic track above which the vehicle is able to move.

The invention further relates to a maglev transport system comprising a magnetic track comprising permanent magnets and a plurality of separate ferromagnetic elements, each ferromagnetic element defining a North or South magnetic pole, and a maglev vehicle, characterized in that the maglev vehicle is as defined above, and in that each cryostat is able to interact with a magnetic induction field generated by the magnetic track.

Advantageously, the number of superconductive elements of each cryostat is equal to the number of ferromagnetic elements comprised between two permanent magnets along a transverse cutting plane perpendicular to the magnetic track.

The invention will be better understood and other advantages thereof will appear in light of the following description, provided solely as a non-limiting example and done in reference to the appended drawings, in which.

Figure 1:
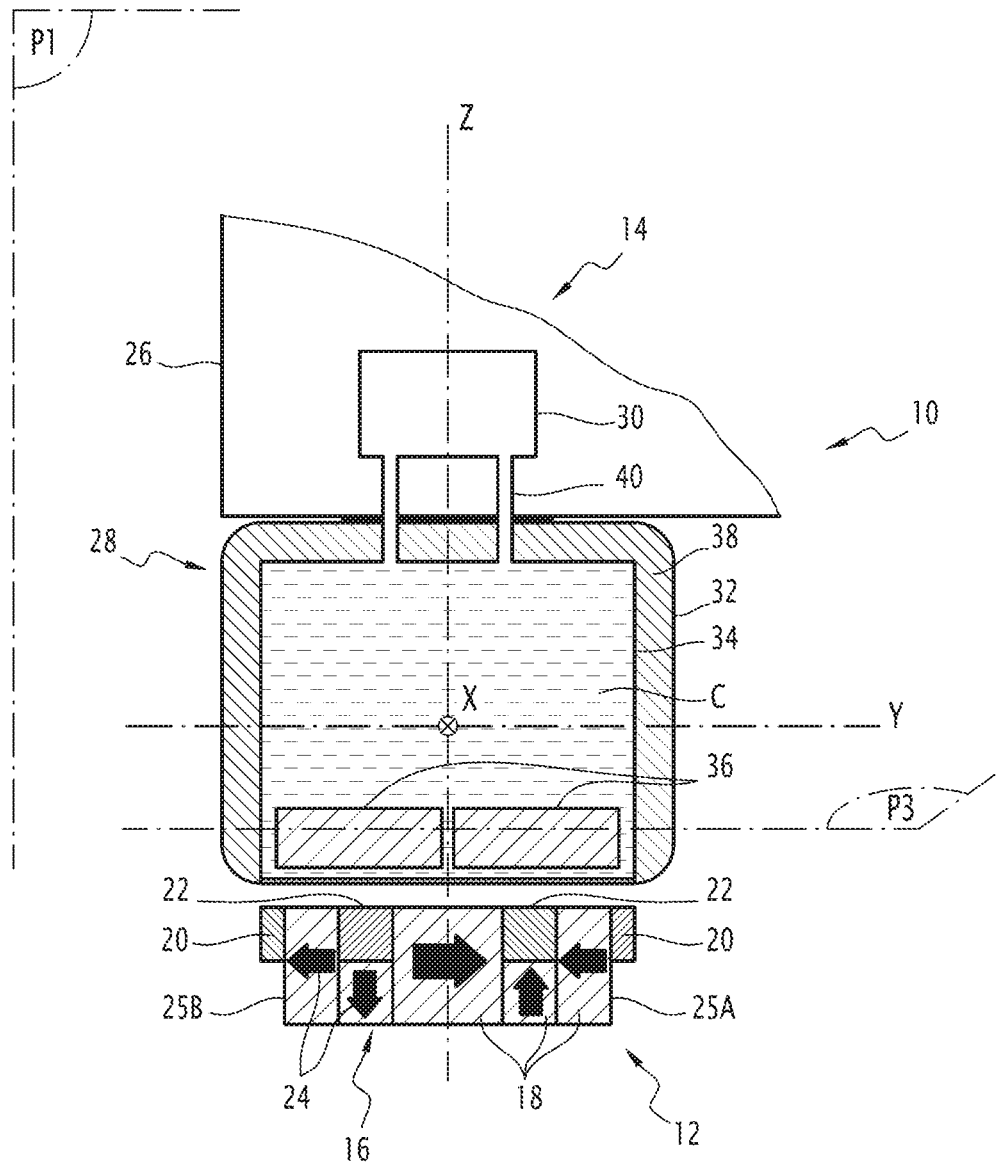
FIG. 1 is a partial schematic illustration of a maglev transport system according to the invention, comprising a magnetic track and a maglev vehicle provided with a cryostat, along a first transverse cutting plane P1 perpendicular to the magnetic track passing through an end face of superconductors integrated into the cryostat along a longitudinal axis X.

The maglev transport system 10 shown in FIG. 1 comprises a magnetic track 12 and a maglev vehicle 14.

In FIG. 1, a single rail 16 of the magnetic track 12 is shown.

The rail 16 comprises a plurality of permanent magnets 18, as well as outer ferromagnetic elements 20 and inner ferromagnetic elements 22 magnetized by the permanent magnets 18.

Advantageously, and as shown in FIG. 1, the rail 16 is in a Halbach configuration, and is made up, along a transverse axis Y perpendicular to the track 12, of alternating permanent magnets 18 and outer 20 and/or inner 22 ferromagnetic elements.

In FIG. 1, polarization arrows 24 are shown on the permanent magnets 18, and indicate the South/North polarity axis of the permanent magnets 18, i.e., the polarization of the permanent magnets 18.

The permanent magnets 18 generate a magnetic induction field B1, not shown, also called magnetic induction field of the rail 16.

The outer ferromagnetic elements 20 are positioned on outer edges 25A, 25B of the rail 16.

The inner ferromagnetic elements 22 are positioned between the outer edges 25A, 25B. The inner ferromagnetic elements 22 are each comprised, along the transverse axis Y, between two permanent magnets 18. More specifically, the inner ferromagnetic elements 22 are each hugged between two permanent magnets 18.

The inner ferromagnetic elements 22 further each rest, along a vertical axis Z perpendicular to the magnetic track 12 and the transverse axis Y, on a permanent magnet 18.

The outer 20 and inner 22 ferromagnetic elements are arranged in the upper part of the rail 16, faced to the vehicle 14.

The outer 20 and inner 22 ferromagnetic elements are made from a ferromagnetic material, for example steel, and form either a North pole, or a South pole, depending on the polarity of the permanent magnets 18 alongside them.

More specifically, each ferromagnetic element 20, 22 forms a North pole when the polarization arrows 24 of the permanent magnet(s) 18 alongside the ferromagnetic element point toward the ferromagnetic element 20, 22.

Likewise, each ferromagnetic element 20, 22 forms a South pole when the polarization arrows 24 of the permanent magnet(s) 18 alongside the ferromagnetic element 20, 22 point in a direction opposite that of the ferromagnetic element 20, 22.

The outer 20 and inner 22 ferromagnetic elements allow guiding of the magnetic induction field B1 toward the upper surface of the rail 16 and the vehicle 14, so that the vehicle 14 interacts with the magnetic induction field B1.

The maglev vehicle 14 comprises a train 26 and a cryostat 28, arranged in the lower part of the train 26, so as to be positioned faced to the magnetic track 12, and more specifically the rail 16.

More generally, and in a manner not shown, the vehicle 14 comprises several trains 26 each provided with at least two cryostat 28, with each cryostat 28 being face to one of the rails 16 of the magnetic track 12.

The train 26 comprises a system 30 for cooling the cryostat 28, suitable for refrigerating a coolant C circulating in the cryostat 28.

The cooling system 30 is for example able to keep the coolant C at a desired temperature, for example around 30 Kelvin (K).

The cryostat 28 comprises a housing 32, a jacket 34 and two superconductive elements 36, comprised in the housing 32. The jacket 34 is an inner jacket and contains the superconductive elements 36 and the coolant C.

Thus, the cryostat 28 is suitable for keeping each superconductor 36 at the desired temperature using the coolant C.

The cryostat 28 comprises a thermal insulator 38 arranged between the housing 32 and the jacket 34.

The cryostat 28 is mechanically secured to the train 26.

The jacket 34 is supplied with coolant C, which is for example liquid helium, with the help of the cooling system 30 and via coolant C circulation tubes 40.

The jacket 34 extends along a longitudinal axis X, perpendicular to the first transverse cutting plane P1 and parallel to the magnetic track 12. The length L1 of the jacket 34, measured along the longitudinal axis X, is for example comprised between 30 cm and 3 m, preferably between 40 cm and 150 cm.

The width W1 of the jacket 34, measured along the transverse axis Y, is about the width of the rail 16, for example comprised between 15 cm and 40 cm.

Each superconductive element 36 is arranged in the lower part of the jacket 34 and is intended to be positioned above the rail 16.

The number of superconductive elements 36 is advantageously equal to the number of inner ferromagnetic elements 22.

Each superconductive element 36 is arranged faced to one of the inner ferromagnetic elements 22 comprised between two permanent magnets 18 along the transverse cutting plane P1, and is advantageously centered on the corresponding inner ferromagnetic element 22 along the transverse axis Y.

Figure 3:
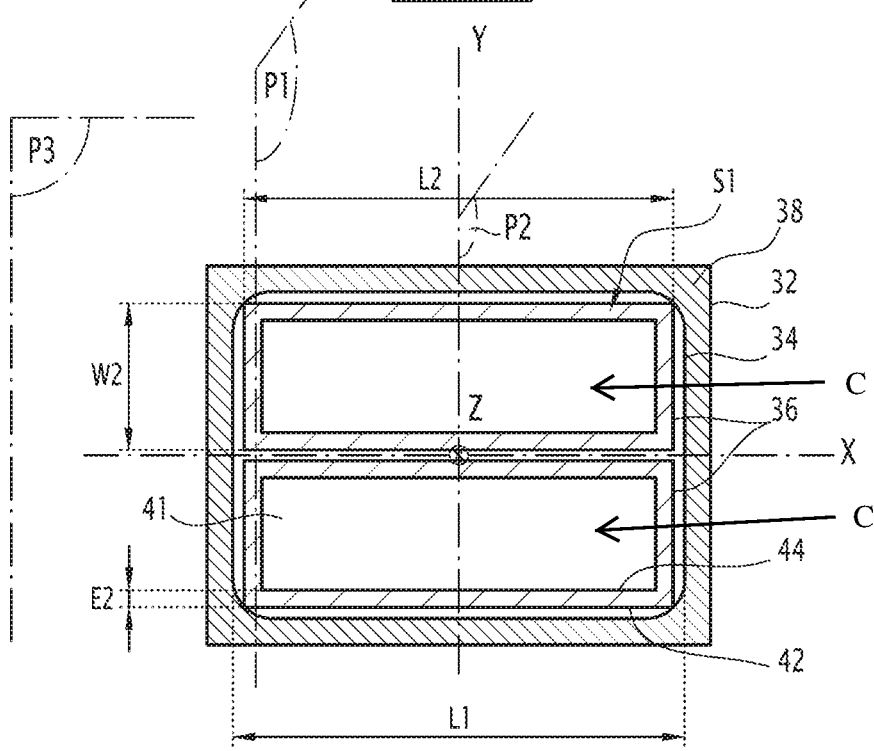
FIG. 3 is a schematic illustration of the cryostat of FIGS. 1 and 2 along a horizontal cutting plane P3 parallel to the magnetic track.

As shown in FIG. 3, the length L2 of each superconductive element 36, measured along the longitudinal axis X, is comprised between 30% and 100% of the length L1 of the jacket 34. Advantageously, the length L2 of each superconductive element 36 is about 90% of the length L1 of the jacket 34.

Figure 2:
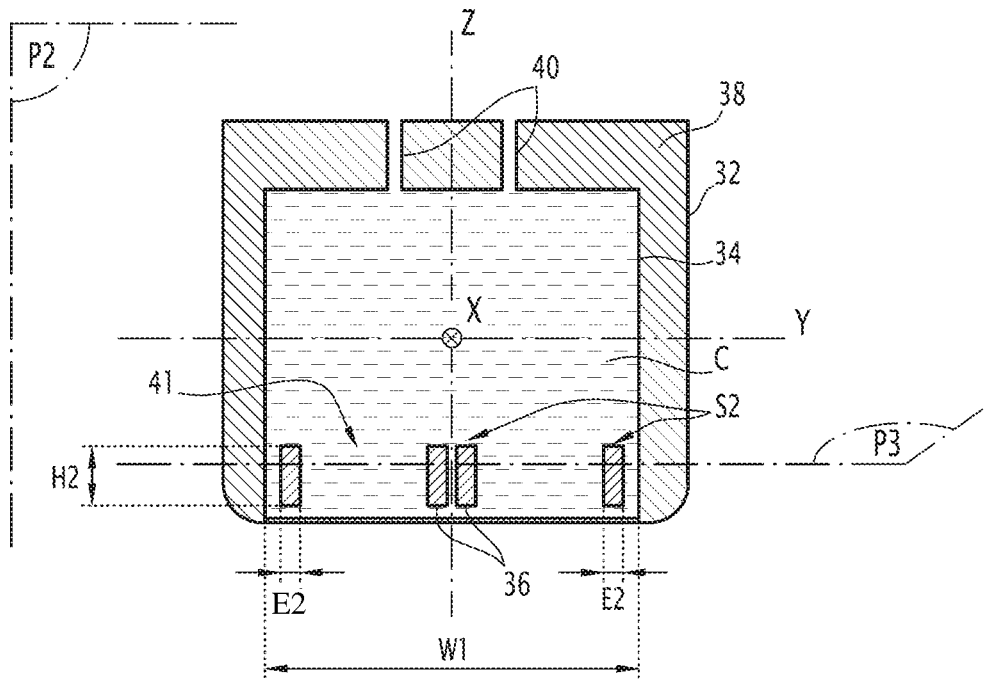
FIG. 2 is a schematic illustration of the cryostat of FIG. 1 along a second transverse cutting plane P2 passing through a geometric center of the cryostat.

As shown in FIG. 2, each superconductive element 36 has a height H2, measured along the vertical axis Z, comprised between 0.3 cm and 15 cm, preferably between 0.5 cm and 5 cm.

Advantageously, the width W2 of each superconductive element 36, measured along the transverse axis Y, is comprised between 30% and 50% of the width W1 of the jacket 34, and the superconductive elements 36 occupy, along the transverse axis Y, between 60% and 100% of the width of the jacket 34.

Each superconductive element 36 is made from magnesium diboride ($MgB_2$) and is advantageously a solid magnesium diboride element. A solid magnesium diboride element refers to an element forming a structurally single part, not associated with a holder, and essentially made up of magnesium diboride, for example more than 95% magnesium diboride.

Alternatively, each superconductive element 36 is made from a superconductive material other than magnesium diboride, such as a member of the cuprate or pnictide family.

More generally, each superconductive element 36 is a solid superconductive material element.

Each superconductive element 36 is for example obtained from a mold inside which a magnesium diboride powder is compacted, then heated. Methods for manufacturing a superconductive element are for example described in U.S. Pat. No. 7,569,520 or U.S. 2007/0123427.

As shown in FIG. 3, each superconductive element 36 is in the form of a tube extending around a central axis parallel to the vertical axis Z. In other words, each superconductive element 36 has a through orifice along the corresponding central axis forming an open-worked central part 41.

In other words, each superconductive element 36 has, in the horizontal cutting plane P3, a horizontal section S1 in the form of an open-worked rectangle.

The horizontal section S1 is defined by an outer contour 42, as well as an inner contour 44 surrounding the rectangular open-worked central part 41 in FIG. 3.

In other words, the outer contour 42 and the inner contour 44 are globally rectangular, and are positioned around the corresponding central axis.

The horizontal section S1 has an area comprised between 2% and 75%, preferably between 5% and 30%, of the area of the total surface defined by the outer contour 42.

Likewise, as shown in FIG. 2, each superconductive element 36 has, in the second transverse cutting plane P2, a transverse section S2 formed by two rectangular faces, separated from one another by the open-worked central part 41. The thickness E2 of each of the rectangular faces, measured along the transverse axis Y, is identical and globally constant along the longitudinal axis X.

Advantageously, each rectangular face has an identical and constant area along the longitudinal axis X, comprised between 5% and 30% of the area resulting from the product of the height H2 and the width W2 of each superconductive element 36, i.e., W2*H2.

The dimensions of each superconductive element 36 are suitable for inducing a maglev force with an optimized value on the vehicle 14, and in particular on the train 26, when the vehicle 14 is arranged above the rail 16.

More generally, the cryostat 28 comprises superconductive elements 36 with optimized shape and dimensions to induce a maglev force F with an optimized value when the cryostat 28 is above the rail 16, i.e., when the cryostat 28 interacts with the magnetic induction field B1 generated by the rail 16.

The maglev force F is exerted between the rail 16, which forms a magnetic induction field source B1, and each superconductive element 36.

The maglev force F is an increasing function of the magnetic moment of the superconductive elements 36, when they interact with the magnetic induction field B1. More specifically, the magnetic moment of the superconductive elements 36 is induced by electric currents created in the superconductive elements 36, when the superconductive elements 36 are immersed in the magnetic induction field B1 and undergo forces, such as their weight or the weight of the train 26, tending to modify their position relative to the rail 16. Yet according to Lenz's law, the creative electric currents produce a magnetic induction field that opposes the magnetic induction field B1 generated by the rail, which causes the maglev force F to appear and explains the levitation phenomenon.

Thus, the greater the magnetic moment of the superconductive elements 36 is, when the superconductive elements 36 interact with the magnetic induction field B1 of the rail 16, the greater the levitation force F is.

Yet for each superconductive element 36, the magnetic moment is approximately proportional to the factor P:

$$P = W2*L2^2 + L2*W2^2.$$

Thus, the dimensions of the superconductive elements 36 make it possible to generate an optimized levitation force F, in particular compared with a plurality typically observed in the prior art of superconductors 36 alongside one another to form a face with width W2 and length L2.

More specifically, the magnetic moment of a superconductive element comprising a face with a predetermined area positioned faced to a magnetic source is greater than the magnetic moment of a plurality of superconductive elements defining a face equivalent to the face with a predetermined area. As a result, the levitation force F that can be induced by the cryostat 28, which is an increasing function of the magnetic moment of each superconductive element 36, is improved.

Furthermore, the use of the coolant C contributes to the levitation of the vehicle 14 in that cooling the superconductive elements 36 below their critical temperature, all other things remaining equal, makes it possible to increase the current density able to travel through them without causing them to lose their superconductive nature. The magnetic moment of the superconductive elements 36 being an increasing function of the current density traveling through them, cooling the superconductive elements 36 via the coolant C makes it possible to increase the magnetic moment, and therefore the levitation force F.

Furthermore, the fact that the superconductive elements 36 have a horizontal section S1 in the form of an open-worked surface makes it possible to save material and reduce the weight of each superconductive element 36, while globally retaining the same levitation force F as when the superconductive elements have a non-open-worked horizontal section. Indeed, the current induced in each superconductive element 36 originate at the periphery of the superconductive element 36, and the current density in a non-open-worked central part of a superconductive element is generally negligible.

Thus, the cryostat 28 has an optimized weight and manufacturing cost, since the weight and the manufacturing cost of each superconductive element 36 are reduced, and is able to induce an optimized levitation force.

The number of cryostats 28 necessary for the magnetic levitation of a given mass is for example reduced by a factor 4 or 5, since the levitation force F able to be induced by the cryostat 28 is optimized.

Thus, the number of cryostats 28 necessary for the levitation of the vehicle 14 is reduced, as is the cost of manufacturing the vehicle 14.

Furthermore, the fact that each superconductive element 36 has a solid magnesium diboride structure makes it possible to offer, when the cryostat 28 is positioned above the rail 16, an optimized magnetic moment in each superconductor 36, and in particular greater than the magnetic moment able to be obtained by an assembly of superconductive elements such as wires or tapes.

Alternatively, each superconductive element 36 has, in the horizontal cutting plane P3, a globally annular open-worked surface defining an elliptical or circular inner and outer contour.

According to one alternative, the number of superconductive elements 36 is a multiple of the number of inner ferromagnetic elements 22 and the superconductive elements 36 are distributed in the longitudinal direction X of the jacket 34, their longitudinal axis advantageously being aligned with a direction along which the inner ferromagnetic elements 22 extend.

According to still another alternative, the number of superconductive elements 36 is comprised between 1 and 12 for each cryostat 28.

According to another alternative, the cooling system 30 is comprised in the cryostat 28.

According to another alternative, each superconductive element 36 has, in the horizontal cutting plane P3, a horizontal section in the form of a solid surface.

According to still another alternative, the magnetic track 12, and in particular the rail 16, are in a configuration other than that described Halbach configuration, such as a Halbach configuration comprising more than two inner polar parts 22, or a Shaper flux configuration, with a single inner polar part 22.

According to another alternative, not shown, the magnetic track 12 is a monorail track and comprises a single rail 16.

Owing to the relative increase in the size of the superconductive elements 36 and the open-working of the center of the superconductive elements 36, the cryostats 28 make it possible on the one hand to improve the levitation force of maglev systems with superconductors for a bulk equivalent to the current solutions, and on the other hand, to decrease the cost of the superconductors 36 implemented, to obtain an equivalent levitation force.

The embodiments and alternatives considered above can be combined with one another to create new embodiments of the invention.

The invention claimed is:

1. A cryostat intended to be integrated into a maglev transport system, the cryostat comprising at least one superconductive element and a jacket inside which each superconductive element is placed, the cryostat being suitable for maintaining each superconductive element at a desired temperature and the jacket extending along a longitudinal axis, wherein the length of each superconductive element along the longitudinal axis is comprised between 30% and 100% of the length of the jacket, and wherein each superconductive element is a solid superconductive material element, and wherein each superconductive element has, in a horizontal cutting plane perpendicular to a vertical axis of the cryostat, a horizontal section in the form of an open-worked surface, each superconductive element being in the form of a tube extending around a central axis parallel to a vertical axis, each superconductive element having a through orifice along the corresponding central axis forming an open-worked central part.

2. The cryostat according to claim 1, wherein each superconductive element is made from magnesium diboride (MgB2).

3. The cryostat according to claim 1, wherein the horizontal section has an outer contour and an inner contour, the area between the outer contour and the inner contour being comprised between 2% and 75% of the area of the total surface defined by the outer contour of the horizontal section.

4. The cryostat according to claim 1, wherein the horizontal section has an outer contour and an inner contour, both contours being with a globally rectangular or elliptical shape.

5. The cryostat according to claim 1, wherein the superconductive element(s) occupy, along a transverse axis of the cryostat, perpendicular to the longitudinal axis, between 60% and 100% of the width of the jacket.

6. The cryostat according to claim 1, wherein the length of the jacket is comprised between 30 cm and 3 m.

7. A maglev transport vehicle, wherein it comprises at least one cryostat according to claim 1, the cryostat being intended to be positioned faced to a magnetic track above which the vehicle is able to move.

8. A maglev transport system, comprising:
a magnetic track comprising permanent magnets and a plurality of separate ferromagnetic elements, each ferromagnetic element defining a North or South magnetic pole, and
a maglev vehicle,
wherein the maglev vehicle is according to claim 7, and wherein each cryostat is able to interact with a magnetic induction field generated by the magnetic track.

9. The system according to claim 8, wherein a number of superconductive elements of each cryostat is equal to a number of ferromagnetic elements comprised between two permanent magnets along a transverse cutting plane perpendicular to the magnetic track.

10. The cryostat according to claim 1, wherein the horizontal section has an outer contour and an inner contour, the area between the outer contour and the inner contour being comprised between 5% and 30%, of the area of the total surface defined by the outer contour of the horizontal section.

11. The cryostat according to claim 1, wherein the length of the jacket is comprised between 40 cm and 150 cm.

12. A cryostat intended to be integrated into a maglev transport system, the cryostat comprising at least one superconductive element and a jacket inside which each superconductive element is placed, the cryostat being suitable for maintaining each superconductive element at a desired temperature and the jacket extending along a longitudinal axis, wherein the length of each superconductive element along the longitudinal axis is comprised between 30% and 100% of the length of the jacket, and wherein each superconductive element is a solid superconductive material element, wherein each superconductive element has, in a horizontal cutting plane perpendicular to a vertical axis of the cryostat, a horizontal section in the form of an open-worked surface, each superconductive element being in the form of a tube extending around a central axis parallel to a vertical axis, each superconductive element having a through orifice along the corresponding central axis forming an open-worked central part, and wherein each superconductive element is made from magnesium diboride (MgB2).

* * * * *